United States Patent [19]

Koriyama

[11] Patent Number: 4,988,903

[45] Date of Patent: Jan. 29, 1991

[54] COIL ASSEMBLY FOR VOICE COIL MOTOR

[75] Inventor: Hiroshi Koriyama, Tokyo, Japan

[73] Assignee: NEC Corporation, Japan

[21] Appl. No.: 407,446

[22] Filed: Sep. 14, 1989

[30] Foreign Application Priority Data

Sep. 16, 1988 [JP] Japan .............................. 63-231815

[51] Int. Cl.$^5$ ..................... H02K 41/00; G11B 17/08; G11B 5/596; G11B 33/14
[52] U.S. Cl. .................................. 310/12; 360/98.07; 360/78.13; 360/97.02
[58] Field of Search ...................... 310/12, 13, 14, 66; 360/78.13, 98.07, 97.02, 97.03, 97.04

[56] References Cited

U.S. PATENT DOCUMENTS

| 4,339,250 | 7/1982 | Thut | 98/31.5 |
| 4,471,395 | 9/1984 | Beck et al. | 360/98.07 |
| 4,922,406 | 5/1990 | Schuh | 360/98.07 |

Primary Examiner—Steven L. Stephan
Assistant Examiner—Judson H. Jones
Attorney, Agent, or Firm—Laff, Whitesel, Conte & Saret

[57] ABSTRACT

A coil assembly for use in a voice coil motor has a pair of coils. A pair of coil frames made of metallic material have each a cavity for receiving therein each coil adhered and fixed in the cavity. The pair of coil frames have respective opposed peripheral portions surrounding the cavity and being adhered and fixed to each other to seal the coils. At least one of the coil frames has at its central portion an airhole. A filter and activated carbon are interposed between the airhole and the coils.

2 Claims, 3 Drawing Sheets

COIL ASSEMBLY FOR VOICE COIL MOTOR

BACKGROUND OF THE INVENTION

The present invention relates to a coil assembly of a voice coil motor, arranged in opposed relation to permanent magnets and supplied with electric current to undergo movement.

The conventional coil assembly of a voice coil motor has structure as shown in FIGS. 3 and 4. Namely, the assembly has a coil frame 11 interposed in opposed relation to a pair of permanent magnets 18A and 18B which face with each other. A pair of coils 12A and 12B are wound on the coil frame 11. These coils 12A and 12B are supplied with electric current within magnetic field generated by the permanent magnets 18A and 18B so as to induce attractive or repulsive force effective to drive the coil frame 11. Such voice coil motor is used as a driving source.

Typical type of the above mentioned coil frame is formed by molding of plastic such as phenol resin in view of production cost. Such type of the coil assembly is utilized, for example, in an magnetic disc drive in which a magnetic head is floated on a magnetic disc with spacing of submicron order. When applying electric current to coils of the coil assembly in order to drive the magnetic head, an insulating layer of the coil, the coil frame or adhesive between the coil and coil frame is heated to generate a considerable amount of gas. The gas deposits on the magnetic disc and the magnetic head to thereby cause serious trouble so-called head clash to destroy the magnetic disc and head.

SUMMARY OF THE INVENTION

An object of the present invention is, therefore, to provide a coil assembly of a voice coil motor, most suitable for a magnetic disc drive, etc. which would be impaired by dust and gas.

Namely, according to the present invention, the coil assembly of a voice coil motor is comprised of a pair of coil frames made of metallic material and having a cavity inside, and a pair of coils disposed in the cavity and fixed to the coil frames by means of adhesive. The pair of coil frames are coupled and fixed to each other at an outer peripheral portion outside the cavity to seal the coils to thereby constitute the coil assembly for use in a voice coil motor. At least, one of the two coil frames is formed with an airhole at a center thereof, and a filter and activated carbon are interposed between the airhole and the coils.

According to the present invention, the coil assembly of a voice coil motor is constructed such that the entire coils are sealed by the coil frames formed of metallic material, the coil frame is formed with the airhole communicating between inside of the coil frames and outside, and the activated carbon and filter are disposed in the pass of gas to the airhole. With such construction, the coil assembly can avoid discharge of gas and dust so as to highly keep clean atmosphere within devices which are provided with the coil assembly.

DETAILED DESCRIPTION OF EMBODIMENT

Next, an embodiment of the present invention is described with reference to the drawings.

Figure 1:
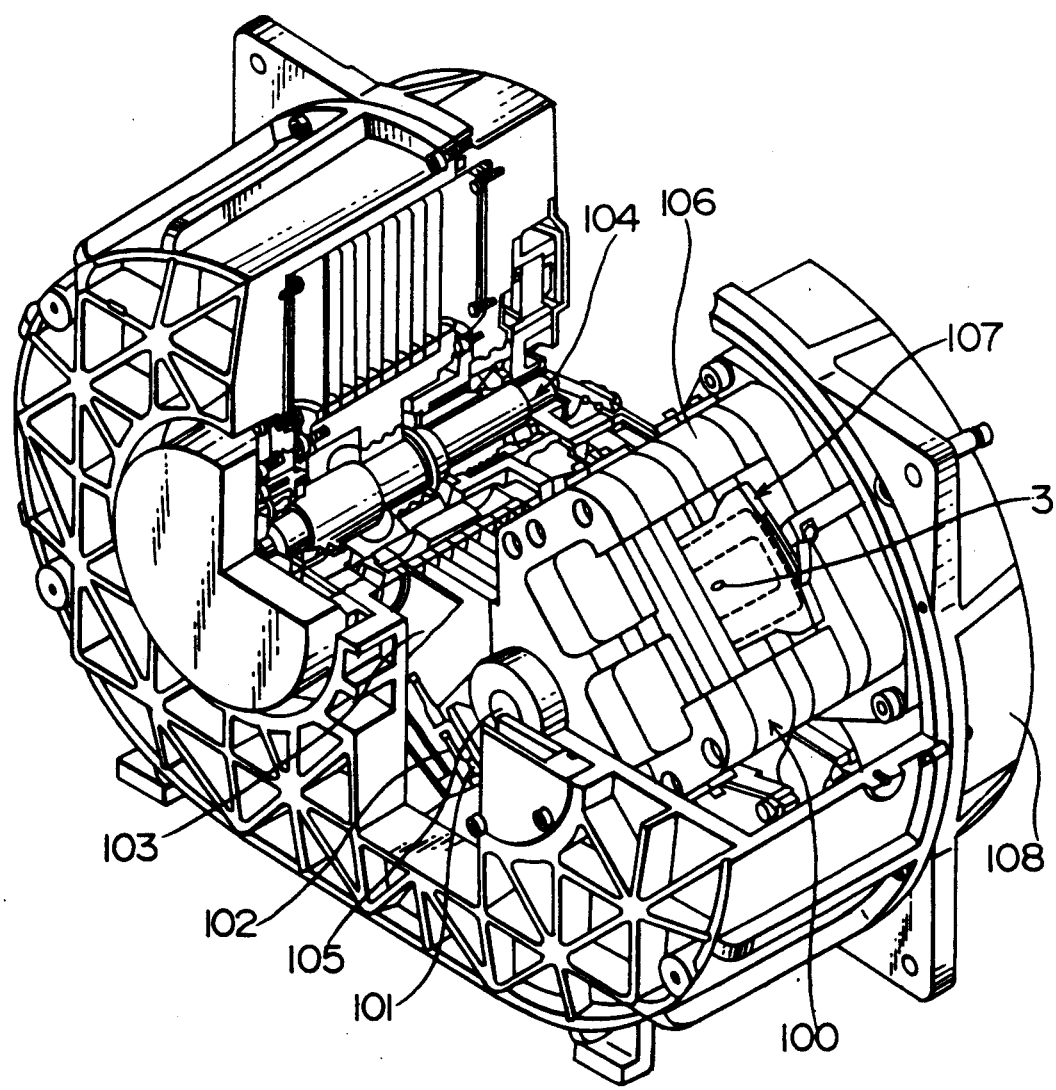
FIG. 1 is a perspective view showing one instance of a magnetic disc drive in which the coil assembly for voice coil motor according to the present invention is provided.

Referring to FIG. 1, a magnetic disc drive comprises a voice coil motor 100 including the coil assembly 107 of one embodiment of the present invention, and a base plate assembly 108. The magnetic disc drive is employed for moving a magnetic head 102 attached to an arm 101 in the radial direction of a magentic disc 103 which is rotated with a spindle 104. The arm 101 is turned around the shaft 105. The voice coil motor 100 is comprised of a magnetic circuit assembly 106 including a permanent magnet and a coil frame assembly 107 in which two coils 2A and 2B are accomodated. As described hereinafter, the coils 2A and 2B are enveloped in the coil frame assembly 107 composed of a pair of coil frames 1A and 1B.

Figure 2:
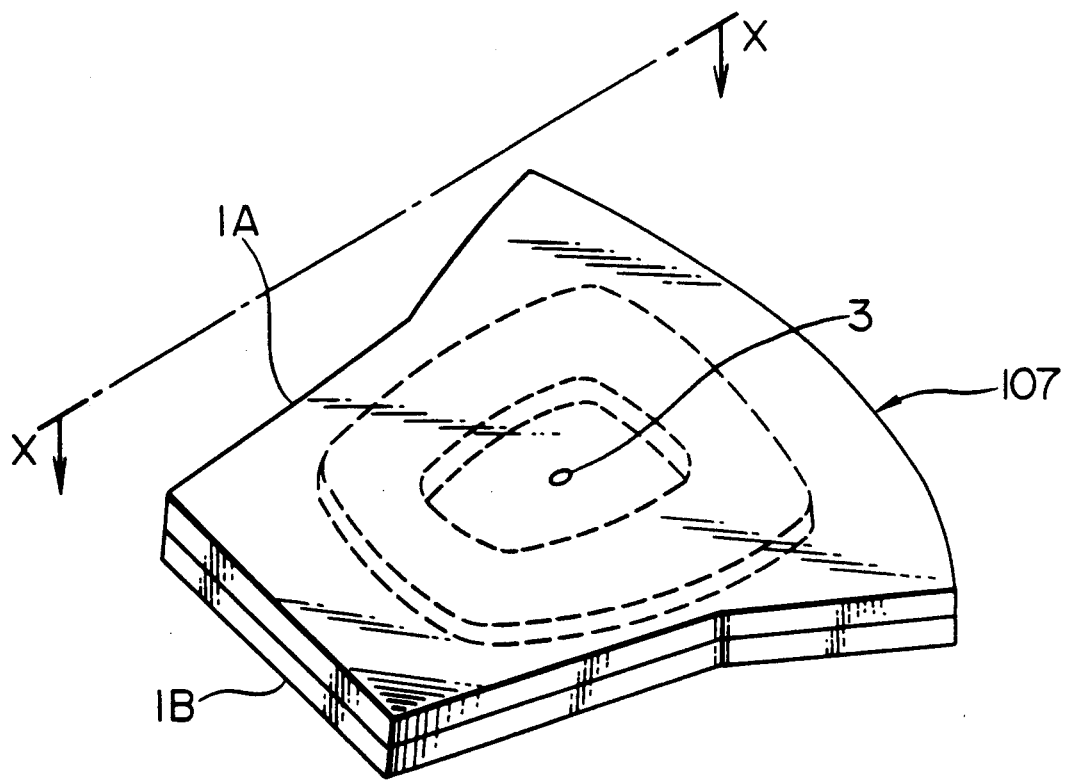
FIG. 2 is a perspective view showing one embodiment of the coil assembly according to the present invention.
Figure 3:
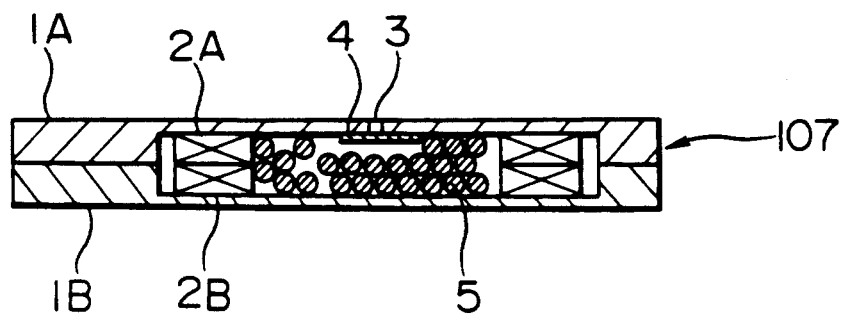
FIG. 3 is a sectional view of the FIG. 2 embodiment, taken along line X—X.
Figure 4:
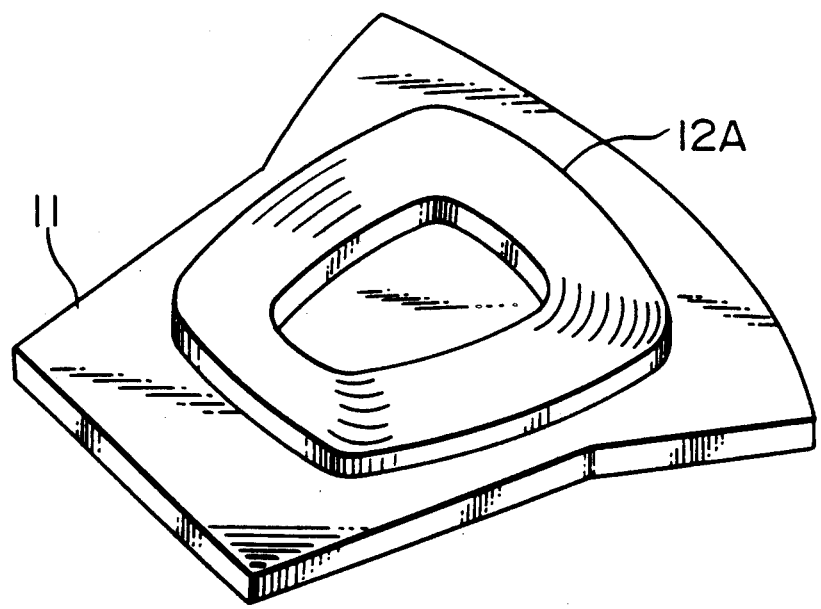
FIG. 4 is a perspective view showing the conventional coil assembly.
Figure 5:
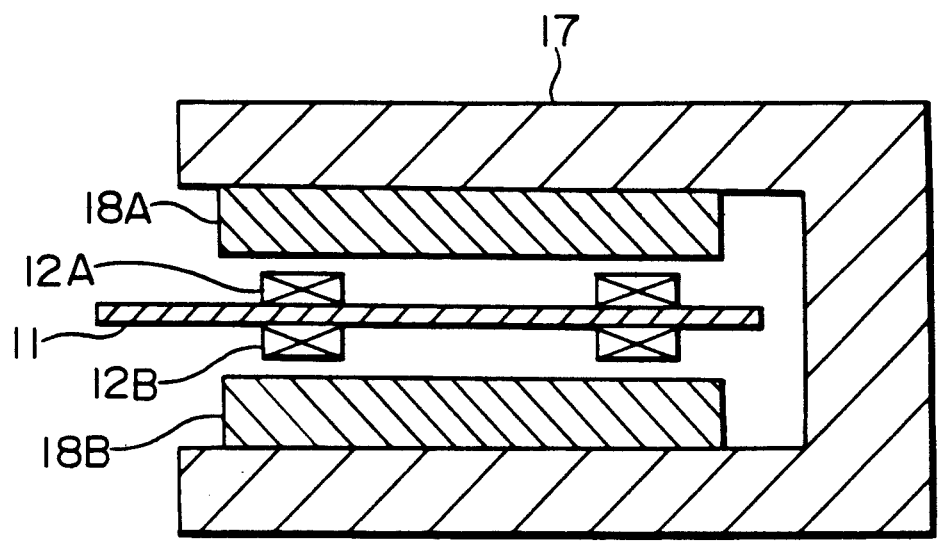
FIG. 5 is a sectional view illustrating a voice coil motor provided with the FIG. 3 coil assembly.

Referring to FIGS. 2 and 3, a pair of the coils 2A and 2B are disposed in respective cavities formed respectively inside a pair of the coil frames 1A and 1B made of magnetically permeable metallic material such as A1, and are fixed thereto by adhesive. The pair of coil frames 1A and 1B are coupled and fixed to each other at an outer peripheral portion surrounding the cavities which accommodate therein the coils 2A and 2B so as to completely seal and hold the coils 2A and 2B. The coil frame 1A is formed at its center portion with an airhole 3. The airhole 3 functions to flow air between the inside of the coupled coil frames containing the coils 2A and 2B and the outside. A filter 4 and activated carbon 5 are disposed inside the coil frames and under the airhole 3.

When an electric current is applied to the coils 2A and 2B, the temperature of the coils 2A and 2B rises abruptly. In this embodiment, since the coil frames 1A and 1B are made of metallic material, they have thermal conductivity greater than plastic coil frames to thereby show good heat dissipation feature. However, when an excessive amount of electric current is supplied to the coils 2A and 2B, the coil frames may not sufficiently dissipate heat such that the temperature of the coils 2A and 2B reaches incidentally to 105° C.–200° C. For this reason, a considerable amount of gas is generated from organic materials such as adhesive (not shown in the figures) used to couple the coils 2A and 2B to the coil frames 1A and 1B and insulating films (not shown in the figures used to insulate the coils 2A and 2B. The generated gas is discharged through the airhole 3 to the atmosphere. The activated carbon 5 and the filter 4 are interposed in the pass of the gas flow for absorption of the gas so as to substantially completely filter the gas and dust to thereby discharge clean air outside. Consequently, air can be kept clean inside the device provided with the coil assembly, such as a magnetic disc drive which needs highly clean atmosphere inside the drive.

What is claimed is:

1. A coil assembly for use in a voice coil motor, comprising: a pair of coils; a pair of coil frames made of metallic material and each having a cavity for receiving therein each coil adhered and fixed in the cavity, the pair of coil frames having respective opposed peripheral portions surrounding the cavity and being adhered and fixed to each other to seal the coils; at least one of the coil frames having at its central portion an airhole; and an activated carbon interposed in said cavity.

2. A coil assembly as claimed in claim 1, further comprising a filter provided on said airhole.

* * * * *